US006829633B2

(12) United States Patent
Gelfer et al.

(10) Patent No.: US 6,829,633 B2
(45) Date of Patent: Dec. 7, 2004

(54) ARRANGEMENT AND METHOD FOR OFFERING A MESSAGE WHEN LOADING SERVICE DATA FOR A TERMINAL DEVICE

(75) Inventors: George G. Gelfer, West Chester, PA (US); Werner Kampert, Hamburg (DE); Ralf Kubatzki, Berlin (DE); Wolfgang Thiel, Berlin (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 808 days.

(21) Appl. No.: 09/829,286

(22) Filed: Apr. 9, 2001

(65) Prior Publication Data

US 2001/0043516 A1 Nov. 22, 2001

(30) Foreign Application Priority Data

Apr. 10, 2000 (DE) ........................................ 100 19 085

(51) Int. Cl.[7] ................................................ G06F 15/16

(52) U.S. Cl. ....................... 709/203; 709/202; 709/204; 709/227; 709/228

(58) Field of Search ................................ 709/200–205, 709/217–219, 223–224, 227–228; 707/102, 104.1

(56) References Cited

U.S. PATENT DOCUMENTS

| | | | | | |
|---|---|---|---|---|---|
| 4,122,532 | A | | 10/1978 | Dlugos et al. | |
| 4,138,735 | A | | 2/1979 | Allocca et al. | |
| 4,831,554 | A | | 5/1989 | Storace et al. | |
| 4,933,849 | A | | 6/1990 | Connell et al. | |
| 5,058,008 | A | | 10/1991 | Schumacher | |
| 5,161,109 | A | | 11/1992 | Keating et al. | |
| 5,233,657 | A | | 8/1993 | Günther | |
| 5,365,044 | A | | 11/1994 | Hesshaus | |
| 5,490,077 | A | | 2/1996 | Freytag | |
| 5,606,508 | A | | 2/1997 | Thiel | |
| 5,675,511 | A | * | 10/1997 | Prasad et al. | 709/204 |
| 5,710,706 | A | | 1/1998 | Märkl et al. | |
| 5,765,164 | A | * | 6/1998 | Prasad et al. | 707/104.1 |
| 5,786,748 | A | | 7/1998 | Nikolic et al. | |
| 5,831,554 | A | | 11/1998 | Hedayat et al. | |
| 5,852,813 | A | | 12/1998 | Guenther et al. | |
| 5,884,039 | A | * | 3/1999 | Ludwig et al. | 709/227 |
| 6,275,855 | B1 | * | 8/2001 | Johnson | 709/224 |
| 6,363,411 | B1 | * | 3/2002 | Dugan et al. | 709/202 |
| 6,594,699 | B1 | * | 7/2003 | Sahai et al. | 709/228 |
| 6,687,877 | B1 | * | 2/2004 | Sastry et al. | 709/204 |
| 6,779,030 | B1 | * | 8/2004 | Dugan et al. | 709/223 |

FOREIGN PATENT DOCUMENTS

| | | |
|---|---|---|
| DE | 198 18 708 | 11/1999 |
| DE | 198 43 249 | 3/2000 |
| DE | 198 43 252 | 3/2000 |
| EP | 0 892 367 | 1/1999 |
| FR | 2 665 003 | 1/1992 |
| WO | WO 98/57302 | 12/1998 |

* cited by examiner

*Primary Examiner*—Bharat Barot
(74) *Attorney, Agent, or Firm*—Schiff Hardin LLP

(57) ABSTRACT

In an arrangement and method for offering a message when loading service data for a terminal device, a connector unit in a service center is connected to a server and is equipped with a number of modems that produce a connection to a communication system to which a number of clients are also connected. The server is operated in order to access a data bank, wherein the properties of the different clients are stored as to the information playback capabilities of the respective clients. The server selects an advertising message that is transmitted to the terminal device of one of the clients dependent on that client's playback capabilities. At least one data file of one of a number of advertising sources is through-connected by the connector unit to the terminal device.

25 Claims, 2 Drawing Sheets

ARRANGEMENT AND METHOD FOR OFFERING A MESSAGE WHEN LOADING SERVICE DATA FOR A TERMINAL DEVICE

BACKGROUND OF THE INVENTION

1. Field of the Invention

The present invention is directed to an arrangement and to a method for offering a message when loading service data for a terminal device suitable for use at a data center for devices such as PC frankers and postage meter machines.

2. Description of the Prior Art

U.S. Pat. Nos. 4,138,735 and 4,122,532 disclose mail processing devices, postage meter machines with postage computers and postage calculating scales that can implement a postage calculation of the basis of a weight value and for which the service of a reloading of a rate table for postage fees is initiated by a remote data center at specific points in time.

U.S. Pat. No. 4,933,849 discloses the loading of various character patterns plus appertaining date on which the character pattern is approved to be printed as postmark. When the data exchange is initiated by the server of the data center, the postage meter machine must remain constantly connected, which, of course, is disadvantageous. The customer has no choice as to when the print format changes and as to whether the customer should make use of the service.

Alternatively, U.S. Pat. Nos. 5,490,077 and 5,606,508 propose that the data loading be initiated by the postage meter machine on demand. The loading can be a single number or count for an accounting or printing function as well as the loading of entire service table data. The database is updated dependent on conditions (such as, for example, name and date) after the postage meter machine is turned on.

U.S. Pat. No. 5,365,044 discloses a franking tape dispenser system with a chip card that contains data for a postage credit and data for an individual advertizing slogan that are printed together on the franking tape.

U.S. Pat. No. 4,831,554 discloses a postage meter machine message printing system. A message is requested from a remote data center, this being printed on an envelope as advertisement of a third party. The transmission of the data for the message ensues by modem in conjunction with the reloading of a franking credit.

U.S. Pat. No. 5,852,813 discloses a method and an arrangement for data input into a postage meter machine. Partial images are communicated from a data center and stored in the non-volatile memory of the postage meter machine. As needed, a partial image is selected by the user with a keyboard and positioned in order to modify the appearance of the franking imprint in predetermined areas. The informational content of a communicated partial image can enhance the areas with little informational content, whereby partial images can be superimposed. The user of the postage meter machine, of course, must be informed about the partial images that are present at a remote location and that the user has not yet loaded. The data center communicates a "I have something for you" message. When, on the basis of this latter message, the user then makes a decision and actuates a corresponding key, a load event for a carrier information sequences fully automatically in order to load additional service data. The carrier information can be data or information regarding a mail carrier that is merely administered by the data center. It is also provided to switch into the standby mode when there is no postal matter to frank with a postage value, The usage pause or input pause is identified in the franking mode and a standby flag is set. A time of day or some other display can, for example, be displayed in the display mode. A command for fetching an advertisement or information (carrier information) communicated during a communication can be entered with an actuation unit. A modem and a normal telephone connection already suffice for the communication.

German Published Application 198 18 708 discloses Internet usage in the context of postage meter operation. Due to the scope of the data to be communicated, the use of modern communication means and networks is desirable in view of the number of very different services, but is limited by the type of communication network that is present at the point of utilization. Moreover, an additional personal computer must be coupled with a postage meter machine in order to achieve the Internet access.

SUMMARY OF THE INVENTION

An object of the present invention is to provide an arrangement and a method that offer an unrequested message from a group of very different terminal devices, the message being capable of being optically and/or acoustically played back.

The above object is achieved in accordance with the principles of the present invention in an arrangement and a method for offering a message when loading service data to a terminal device, wherein information regarding the respective playback capabilities of a number of terminal devices is stored in a data bank, and wherein a server has access to the information in the data bank as well as access to service data from a service data source, and has access to one or more message from at least one message source. The message or messages has a playback requirement associated therewith, dependent on whether the message is composed of text, video data, running text data, audio data, etc. When service data are to be downloaded via the server to one of the terminal devices, the server establishes a communication link, via a communication system, to that terminal device. Based on the information stored in the data bank, the server determines whether the connected terminal device has playback capabilities matched to the playback requirements for the message, or a selected one of the messages. If so, the server transmits the message together with the service data to the terminal device.

The data center, which is configured as a service center for reloading devices with a credit and other service data, is inventively equipped at least with an internal "news" service that delivers messages. A connector unit sets up the communication connection to predetermined services on demand via a terminal device. A number of modems or other data transmission means adapted to respective communication systems are connected to the connector unit. The connector unit contains at least one switching assembly. A data bank is connected to a server that can undertake a selection of a message that is communicated to the terminal device, preferably together with the requested service data. The message can be supplied by one of the internal services or from external sources. The connector unit automatically sets up a connection to the terminal device. The terminal device is equipped to play back a message intended for the customer (client) during or after the communication. The selection of a message is based on the technical equipment of the terminal device for implementing a playback. The technical format of the message is based on whether the message is transmitted to a PC franker, to a postage meter machine or to some other mail processing machine.

Postage meter machines, PC frankers or other mail processing machines send request data to a service center in order to request services of various types. The communication of the data transmitted in conjunction with a requested service may take considerable time under certain circumstances. The aforementioned information can be played back by the machine during this time. This information cannot be printed on a piece of mail but only can be displayed in the display of the postage meter machine or played back acoustically. For example, specific advertising information that is not intended for printing is transmitted from the service center before, during or after the communication of the service data. The playback of this advertising information not intended for printing ensues during the transmission (on line) or after the transmission (off line).

Advertising information can be co-transmitted precisely in conjunction with a short service data transmission to the postage meter machine. The advertising information then can be displayed, preferably in the display of the postage meter machine after the transmission (off line). Data of an advertising message that are not connected with the functions of printing or franking or mail processing thus are also called and presented at a postage meter machine for the first time.

An advantage of the invention is that services of the server can be accessed at any time, independently of the franking. In addition to the very different services, information is communicated that achieves a very high recognition profile for the services of a specific mail carrier or of some other service device, and the facilitated monitoring that is thereby possible also reduces a risk of confusion with other services. Enabling the playback of image and text, running text, music, sound, noise as well as video scenes is also considered a service according to the invention. The message that is thus communicated, of course, is only intended for the device user (client) but not for the mail recipient.

Statistical data of the device-specific equipment as well as non-statistical usage data that reflect user behavior over a time span shall be considered below as properties of the various clients. The device-specific data include the device number, software version number, amount of free memory space, the display type and other data and are automatically taken into consideration in the selection of the message. The display, for example an LCD, assures that only little power is used for this purpose. Thus, displayed texts and images can be displayed given a postage meter machine with a large LCD, whereas the presentation in the form of running text given a scale with a smaller display seems more suitable.

The far larger picture screen or a large flat picture screen as well as the free memory space given a personal computer with a franking program (PC franker) enlarge the possibilities for the scope of the data to be communicated to such a device.

DESCRIPTION OF THE PREFERRED EMBODIMENTS

Figure 1:
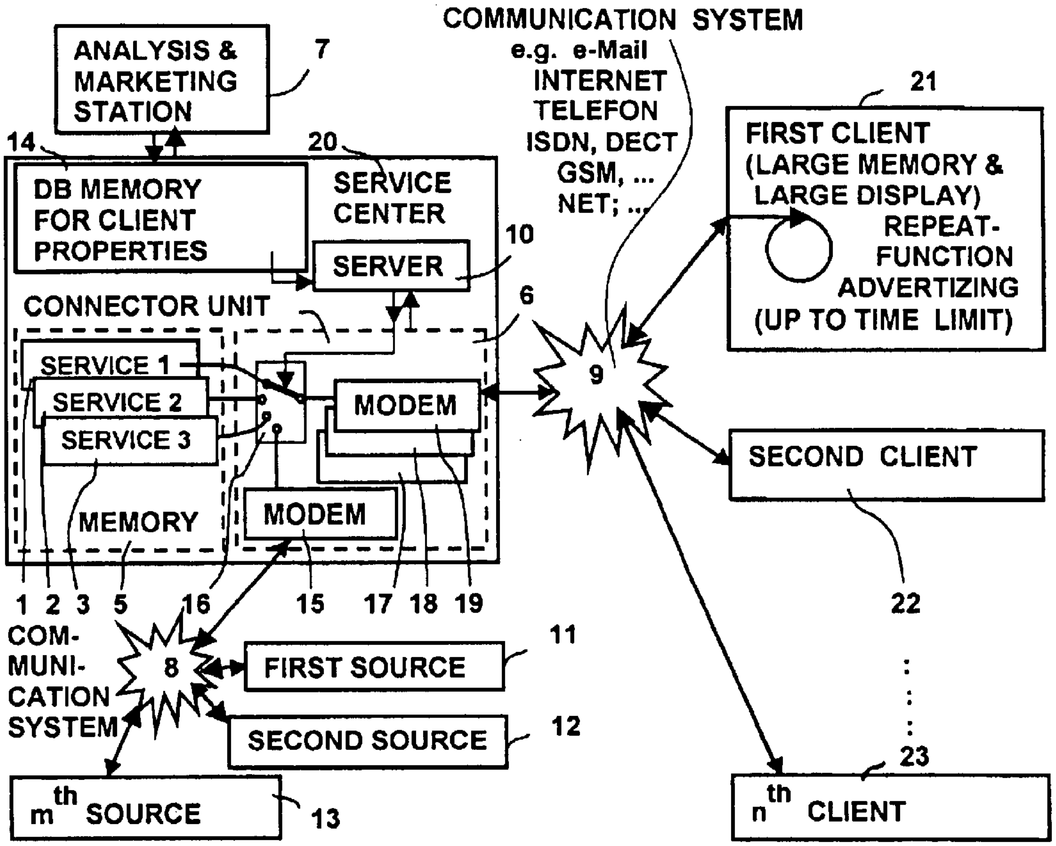
FIG. 1 is a block diagram of a client/server communication in accordance with the invention.

FIG. 1 shows a block diagram of a client/server communication. After receiving a request from a client 21 (among n clients) via a communication system 9, a connector unit 6 in a service center 20 sets up a requested communication connection to a memory 5 that is used by a predetermined service. A first service 1—shown in FIG. 1—is through-connected to the client 21 via switch controlled by a server 10, a modem 19 and the communication system 9. For example, the first client 21 is a postage meter machine. The postage meter machine has large memory capacity, at least for the service data, and a large display in order to display or play back the additional data communicated via a modem 19 during the communication with a server 10 after the switching in the service center 20. The components of a mail processing system having a thermal transfer postage meter machine of the type T1000 are disclosed in detail in German Published Application 198 43 249. The display incorporated in modern postage meter machines is also currently suitable for the display of image and text on the basis of suitable auxiliary data. An ink jet postage meter machine of the JetMail® type postage meter machine that is commercially available from Francotyp-Postalia AG & Co. is described in German Published Application DE 197 11 997.

The base or the postage meter machine can include a modem and a chip card reader unit as a further input means in addition to a standard keyboard. The display and keyboard form a user interface, at least for the ink jet postage meter machine. After being turned on, the ink jet print heads of the ink jet postage meter machine are first thoroughly cleaned. Since a large amount of ink is used when cleaning the ink jet print heads, an ink jet postage meter machine is usually only turned off at the end of the day, i.e. the modem and the user interface of the ink jet postage meter machine are operationally available during pause times in order to communicate messages and in order to display at least auxiliary data. The user interface can access individual stations of the mail processing system and inventively access the remote service center in order to make use of its services.

The second client 22 shown in FIG. 1 is, for example, a postage calculating scale. Request data are communicated therefrom to the server 10 via the communication system 9 and another modem 18. For example, the switch 16 is switched by the server 10 to the service 2 for reloading service data. Reloading of service data is disclosed in detail for postage calculating scales in the aforementioned German Published Application 198 43 249. Inventively, a third service 3 can now be accessed, for example, storing data files for running script. The display of the client 22 (scale) can be utilized for the playback of the auxiliary information in the form of running script and display texts.

The third client 23 shown in FIG. 1 is, for example, a PC franker. The components of a mail processing system with a personal computer PC and a base of the ink jet postage meter machine of the JetMail® type are described in detail in German Published Application 197 11 998. The system has the advantage that mixed mail can be processed with the base. Another system with a personal computer PC and a digitally functioning printer is only capable of single letter handling and is intended for the SOHO market (Soft Office Home Office). Such systems are likewise referred to as PC frankers. The picture screen of the personal computer is also fundamentally suitable for the presentation of video sequences when a fast modem is installed in the PC or is connected to the PC and there is enough free memory capacity. A large number of transmitted images can be stored in MPEG quality. A rapid playback of these images produces true-to-life video sequences.

Equipping a PC with a sound card and with speakers or the connection of corresponding boxes is likewise already standard. The server 10 of the service center 20 supplies compressed, digital MP3 data via modem/Internet that are downloaded into the PC and stored in a flash memory. The playback of the data from MP3 datafiles conveys an audio impression of nearly CD quality. Even short video clips (video and sound) thus can be played back at the client 23 (PC), with the time required for the data transmission in the updating of the service data or one of the other pause times is utilized for the playback.

The connector unit 6 of the service center 20 can be a commercially available terminal server that is connected to the server 10 and that is equipped with a number of modems 15,17,18,19 and the switch 16. The Maxserver20 of the Xyplex company is suitable as such a terminal server, allowing the connection of a maximum of twenty modems.

As an advertising purveyor from external sources 11, 12 or 13, the server 10 offers advertising data files in a specific format, and the server 10 can store this format in a memory 5 as, for example, a part of service 1, 2 or 3, or can directly forward it to any of first through n clients represented by clients 21, 22, 23.

The advertising data from m external sources represented by sources 11,12 and 13 is made available to the clients 21–23 via the modem 15 of the connection unit 6, which communicates with the m external sources via a communication system 8.

As soon as a request from one of the clients 21–23 is received, the server 10 accesses a data bank 14. The properties of the different clients 21–23 are stored in the data bank 14, for example the fact that the terminal device 21 is a postage meter machine that has means for processing and playing back image and text data files, that the terminal device 22 is a postage calculating scale that has means for processing and playing back running text data files, and that the terminal device 23 is personal computer or a PC franker that has means for processing and playing back sound or video data files.

In conformity with these stored properties, data files from internal sources (services 1, 2, 3, or more) via the switch 16, the modem 19 and the communication system 9 or data files from one of the m external sources 11, 12, 13 can be through connected to one of the clients 21, 22, 23 via the communication system 8, the modem 15, the switch 16, the modem 19 and the communication system 9. The server 10 is correspondingly operationally connected to the data bank 14 and the switch 16 in order to be able to at least access the data files of the services 1, 2 and 3 in the internal memory 5. The switch 16 is fully electronically fashioned as a multiplexer, and is driven by the server 10 via the terminal server. The data bank 14 is maintained by an analysis and marketing station 7 having a communication connection with the service data center 20, which supplies and updates information as to whether the terminal devices at the clients 21–23 are equipped with means to play back advertising for storage in the data bank 14.

In an augmented version, the service center 20 is configured for processing different, unspecified data files of advertising sources. After a selection of a message that is stored in one of the services 1, 2, 3, or the external sources 11, 12, 13, a processing of a selected datafile with the selected message ensues in the data center 20 for conversion of the format of the data files before the transmission of at least one datafile and communication and storage of the selected message in the clients 21, 22, 23 subsequently ensue. The server has conversion means (programs and hardware) in order to convert these unspecified data files into those formats that can be played back (displayed) on the terminal devices of the respective clients 21–23.

Figure 2:
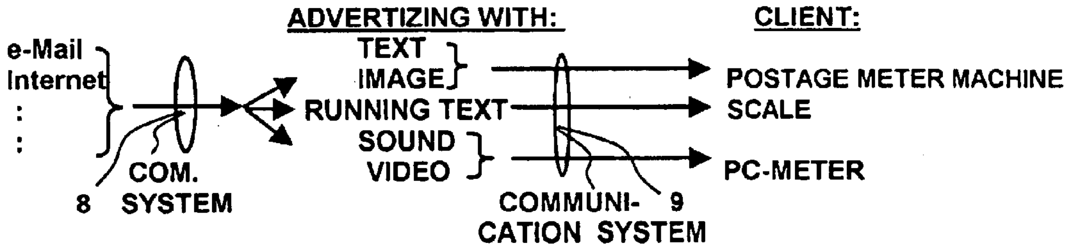
FIG. 2 illustrates control of a connector unit for different clients in accordance with the invention.

The control of the connector unit 6 for different clients is illustrated in more detail in FIG. 2. The server 10 connected to the connector unit 6 analyzes data files from the communication system 8 or from the services 1, 2 3 with respect to text, image, running text, sound and video data files and groups them with regard to whether a playback of the message can ensue with a requesting terminal device at the client 21, 22 or 23. Corresponding to the properties about the terminal device at the client 21, 22 or 23 stored in the data bank 14, the switch 16 in the connector unit 6 is switched by the server 10 so that only data that can be played back at the requesting client 21, 22 or 23 are transmitted thereto.

In the future, the existing data center will be developed increasingly into a service center that offers a multitude of services and service features, including the communication of a message. For example, a message can be to provide an overview of possible services and performance features. At the terminal device, the invention thus supplies an interface to the remote service center.

Advantages of the invention are that, using a "news" service, an advertising or informational message can be communicated and played back by the terminal device with text and image or with running text since a suitable display or other suitable playback device is now present in modern postage meter machines or scales.

An interactive user interface to the service center is produced in combination with input means (for example, keyboard, chip card). For example, a communicated, informal message can be that further services or products that are offered via the service center are highlighted. The terminal device should have corresponding output means and input means available, i.e. means for displaying and offering services and for the selection of payment for such services. This enables a number of further advantages over a mere playback of a message.

Co-pending U.S. application Ser. No. 09/481,477 filed Jan. 11, 2000 discloses a method and arrangement for automatically ordering supplies which are consumed during usage of a device, such as a postal device. Differing therefrom, an order can now be placed for consumables (for example, writing paper, envelopes) as needed or on demand by the customer when products or a manufacturer or distributor of these products or of a carrier are offered in a commercial message. The ordering can be triggered by plugging a chip card in or by actuating a keyboard or via some other input means.

An informal message, for example, can be communicated targeted to a predetermined group of customers. A selection of the customers for selected offers is possible in the service center 20 on the basis of specific usage data. The usage data are stored in the data bank 14 of the service center 20, so that the offered products (for example, writing paper) only reach the interested group of customers. A sales pitch on the basis of specific usage data, of course, requires an advance analysis with classification of all customers based on the type and range of writing papers employed. An analysis of the customers for selected service offers on the basis of the usage data is possible in the analysis and marketing station 7 connected to the service center 20.

Standard and/or (local) special offers of a carrier likewise can be offered in a commercial message. These offers are based on usage data, such as the numbers of franked pieces of mail acquired in franking classes (class of mail). Such usage data can be queried on the basis of a special service of the service center 20 given every communication with a terminal device.

Mail carriers such as, for example, UPS or Federal Express also can present their standard offerings for letter and package transport to the customers or point out locally limited, or time-limited, special offers. An adaptation of the offer to the respective use pattern of the customer also is possible. Thus, customers having an overwhelming use of large-format outgoing mail (brochures) can receive customized offers from the mail carriers.

Co-pending U.S. application Ser. No. 09/410,522 filed Oct. 1, 1999 discloses examples for the realization of a method for storing data about a usage of a terminal device. The usage data are stored in a postage meter machine over the course of a time span (for example, for a month). The memory capacity of a postage meter machine that was originally free is restored after every communication of the usage data. The specific service of the service center must have a memory capacity that is many times higher in order to be able to analyze a user behavior pattern for a number of postage meter machines for a longer time span (up to a year). Of course, the above-described advantages are not limited to the mail business. Less specific advertising or greetings announcements or messages can be communicated to the client fundamentally in the same way following an analysis. The client can at least play back alphanumerical, visual or musical messages.

As noted above, the first client 21, for example, is a postage meter machine with a high-resolution display for the image playback. The postage meter machine is set to or programmed for the reception of data files and their playback while the switch 16 is switched to the service 1. The switch 16 is then switched to a second service 2 and the loading of postage rate table data from the service center is triggered. An image playback for advertising purposes sequences on the display in the meantime.

As also noted above, the second client 22 is, for example, a scale. On demand from the scale, the switch 16 is switched to the first service 1 for loading running text and is then switched to the second service 2, and the loading of postage rate table data from the service center 20 is triggered. The scale can directly use a modem (not shown) of the postage meter machine for the communication with the service center 20. Of course, music or video data are not communicated to the scale since these cannot be played back. The properties of the different clients stored in the data bank 14 insure a suitable connection of services with stored data datafiles that are output to the client 22 via the switch 16, the modem 17, 18 or 19 and the communication system 9.

As also noted above, a PC franker as the third client 23 can be equipped to be able to process and play back commercials with sound and video datafiles. The microprocessor of the terminal device of the client 23 can communicate the request data by modem to the modem 17, 18, or 19 of the remote service center 20 via the communication system 9. The communication system 9 can operate using radio transmission/reception devices and request data can be communicated by radio (GSM, DECT, etc.) or some other communication arrangement (Internet, e-mail, etc.) can be used. As a result of a service request, advertising information can be transmitted to the terminal device, which is programmed to display this advertising information at its display during the transmission (on line) or after the transmission (off line). The selection of the advertising information is made by the remote service center 20. Given a service request, this recognizes the type of terminal device, the type of service request and the date. Further information about the terminal device (for example, customer, location, user behavior, etc.) are known in the remote service center 20 at the data bank 14.

The service center can insert a confirmation into the protocol. The terminal device can be programmed to read (OK) or not read (skip) the data of the message (advertising information).

Figure 3:
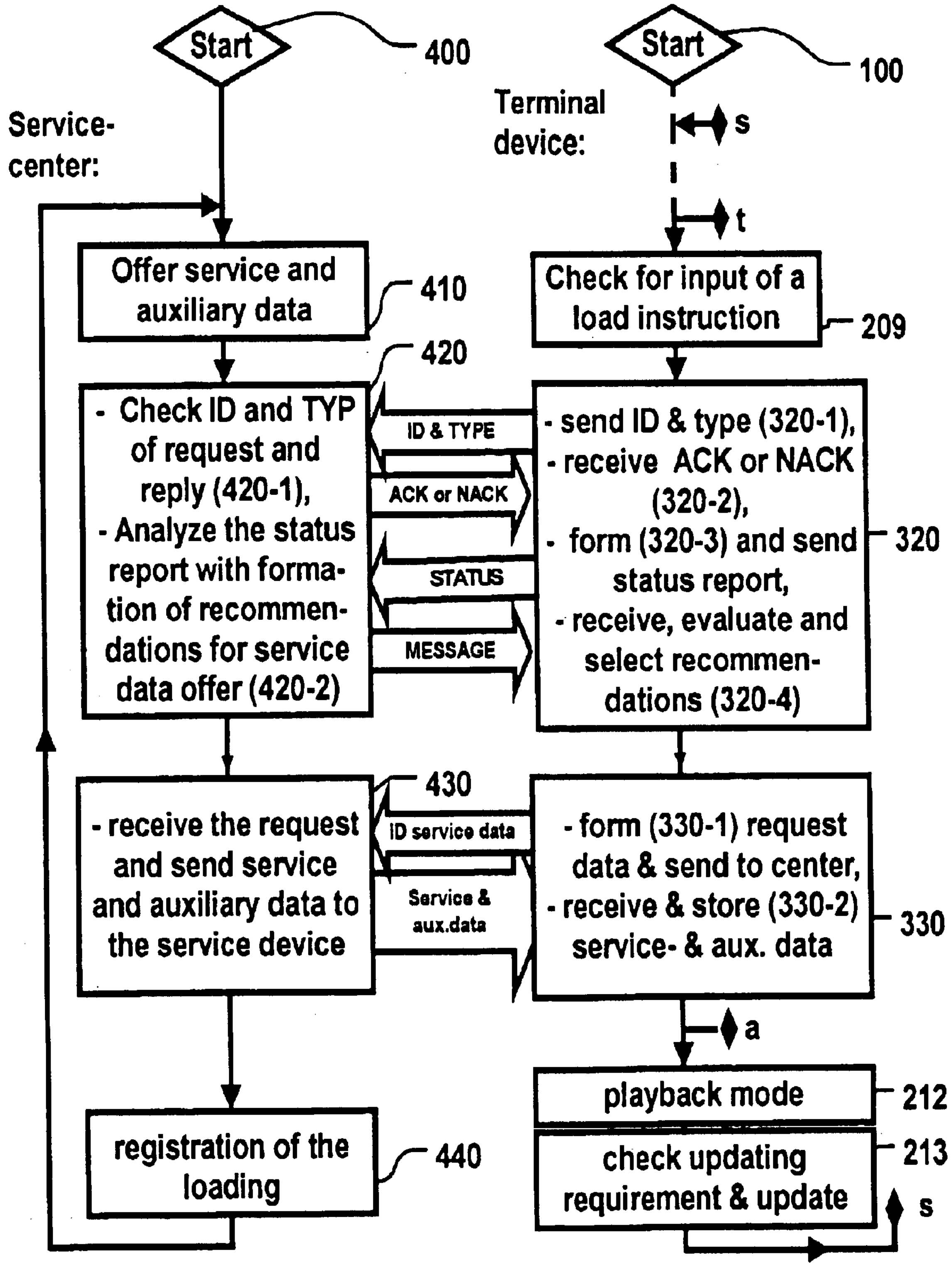
FIG. 3 is a flowchart for the communication mode in accordance with the invention.

The flowchart of the communication mode for a terminal device at a client 21, 22 or 23 and corresponding executive sequences in the service center 20 are explained on the basis of FIG. 3. The terminal device is started in step 100, and a number of steps are run that are well known in the meter technology. A check for an entry of a load command ensues in an input routine 209 in order to start a communication on demand. The communication in the communication mode 300 includes at least one first and one second transaction that have a number of sub-steps.

The first transaction 320 begins in a first start sub-step with the communication of the identification ID of the terminal device. The ID is, for example, the postage meter machine serial number. With the ID, the machine type of the calling terminal device, the ISO country code, a service ID or a release of the transmission protocol can be optionally communicated. The service ID describes the domain of the solicited service, for example postage rate table, slogan as well as crypto-link reloading service. The release describes the current technical status of the transmission protocol. In a second start sub-step, at least the type of transaction is communicated in order clarify what service data are to be loaded. In addition to the type of transaction, further, specific messages can be communicated: type and ID of the terminal device that uses the service data, for example a postage computer or a postage-calculating scale. A description of the service software of the destination machine and its capabilities with respect to the loading optionally ensues.

The terminal device has a microprocessor that forms a status report during the first transaction. Corresponding to a program stored in the program memory 11, a list with a table of contents of the memory occupancy is produced according to to the requirements for the terminal device. In particular, it is possible that the terminal device stores postage tables compressed in a memory area and only "unpacks" these as needed. Postage tables, however, can also be present stored unpacked or in the Intelhex format. In addition to the information that describe the size of the available memory capacity, the total number of existing memory areas for the corresponding service, the data formats and patches (Intelhex format) and memory size of the service data, brief descriptions of the service data or, respectively, contant particulars are also classified in this table of contents. Each postage table of a carrier bears a carrier name or, respectively, a carrier ID and has a version number, a revision number and a validity date. The latter identifies the validity from a predetermined date. The combination of version and revision number can be termed a "release". A third sub-step of the first transaction 320 includes the aforementioned formation and transmission of the status report STATUS to a specific server 10 of the service center 20. In a sub-step 410 of the step 420, the server 10 implements an analysis of the communicated status report and forms recommendations as a result of the analysis with regard to newly offered service data from one of the carriers. The type of service table, the ID of the table memory and the recommended operation is communicated for each stored service table, for example that the appertaining table is valid and should be retained. Alternative operations are a replacement of individual table sections or service data by patches, a deletion without substitution or—if a replacement is present—changing the table. A recommendation likewise initially ensues with respect to a predetermined table. Corresponding to the properties of the different clients stored in the data bank, datafiles of the services 1, 2, 3 and of the advertising sources 11, 12, 13 can be through-connected to the client 21 via the connector unit 6 and the communication system 9. The recommendations are communicated to the terminal device in a message MESSAGE as an analysis result of only a few bytes and/or in the form of an amended list of possible changes. The form of the list is retained in the latter instance, however, it can differ in form at other terminal devices. The list only contains details for possible memory occupancy with current service data and data that will be current in the future, but not the service data. The service data are not communicated until a following, second transaction 330, 430.

If there are no current data to be reloaded, it is still possible for corresponding recommendations to be communicated to the terminal device. Usually, however, there are changes when the loading is initiated, so that the recommendations include a number of proposals.

The communicated recommendations are received in the fourth sub-step of the first transaction and interpreted in the terminal device in order to make a corresponding memory area available, or in order to select a free memory area. A selection of one of the recommended tables in the terminal device (client) ensues during the evaluation of the aforementioned fourth sub-step. The client needs the description of a table or one of the tables that the server 10 should send in the second transaction for the following download step. The following scenarios are possible:

1. the client selected from the recommendations received in the preceding section. Different terminal devices are thereby possible as client, i.e. those that require a user input are whereat the selection ensues automatically.
2. The client wishes to resume an aborted download, i.e. the client knows which tables were loaded when the abort occurred, which part of the data already loaded is valid and knows the offset for a resumption of the loading.
3. The client explicitly requests a table (needs interaction with the user).

In the following, second transaction 330, request data are first formed. The request data identify the desired service data. In particular, the table type and the table description are communicated as request data for postage rate tables. Optionally, a message “offset” is communicated as a four byte value for the continuation of an interrupted communication. At the start, there was not yet any interruption and the offset value is zero. For such identified request data, alternatively, an order number for a table with service data can also be transmitted from a different terminal device when each table is assigned to a unique order number.

Similar to that described above, the second transaction 330 always begins with the communication of the identification of the service data that are to be loaded. The communication ensues to the service center 20, i.e., the server 10 thereof, following the start 400, replying to the first transaction with an ACK signal in the second step 420 as long as the identification number ID of the terminal device is not listed in the data bank 14 as inhibited. Otherwise, the transmission of an NACK signal proceeds to the terminal device. For example, the terminal device is a postage meter machine according to FIG. 1 and the type of the service data is a postage rate table. In the second sub-step of the first transaction, the communicated reply is received at the terminal device. If a NACK signal is received, a status report of the memory occupancy is formed at the terminal device (client) and the communication is then continued.

The server 10 thus receives this request in a sub-step of the step 430 and sends the requested service data to the terminal device in a sub-step. In a second sub-step of the step 330, the terminal device receives and stores the service data communicated in the data transfer. After each data transfer, the microprocessor determines whether all requested service data have been completely communicated or whether a resumption or, respectively, continuation of the communication with further transactions is needed. Performance feature data are communicated in the form of a message together with the service data. If, however, it is found after the data transfer that all requested service data and auxiliary data were transmitted, then point ‘a’ is reached. The terminal device switches into the playback mode (step 212) after point ‘a’ is reached.

Alternatively, the microprocessor switches the terminal device into the playback mode after each data transfer. The playback of performance feature data from the message thus can already begin before the data transfer of service data has been concluded.

A selective download of individual component parts of the load system is achieved in that a corresponding entry for table type is set for identifying a table for a download. This occurs in the sub-steps (320-3) shown in FIG. 3, forming the status report, analysis and formation of a list with recommendations (420-2) of changes, forming request data (330-1). For example, at least the following types are possible:

- rate table
- display strings (for example, texts for selective imprints or auxiliary texts)
- combinations (plausible combinations of shipping parameters)
- international database (for example, ISO table for country code)
- news (advertising or informational communication or message)

An updating requirement for the service data can be checked in the evaluation mode 213 and the service data can be updated, if necessary. After the step 430, at least one registration of the loading in step 440 ensues in the service center 20. The charge for the communicated performance feature data can be formulated by the service center 20. If the acoustic and/or visual presentation induces the user to preferentially use performance features from the offering of a specific performance feature device, a conveyance charge can be payable to the operator of the remote service center 20 that, in turn, entirely or partly credits for the customer. For example, the charge for a rate table loading or for the credit reloading for preferred customers can be assumed by a third party when the reloading is associated with the playback of an advertising jingle that can be played in the pauses of the franking mode and has a high recognition profile for the third party.

Instead of one memory 5, for example, a separate memory or computer can be provided for each service 1, 2 or 3. In another embodiment, the server 10 can internally contain the data bank 14 and further components, such as the connector unit 6. The server 10 of the service center 20 can be equipped with the memory 5 for at least one service.

The server 10 can be networked with further servers or can be in communication with a server of a national postal service or with a bank server in order to store rebates or credits.

Although modifications and changes may be suggested by those skilled in the art, it is the intention of the inventors to embody within the patent warranted hereon all changes and modifications as reasonably and properly come within the scope of their contribution to the art.

We claim as our invention:

1. An arrangement for offering a message to a terminal device, comprising:

a data bank in which information identifying respective playback capabilities of a plurality of terminal devices is stored;

at least one message source which provides at least one message having a playback requirement associated therewith; and a server adapted for communication with a selected one of said terminal devices, said server having access to said information stored in said data bank and being connectable to said message source to receive said at least one message therefrom, said server determining from said information in said data bank whether said selected one of said terminal devices has playback capability matched to the playback requirement of said message and, if so, said server transmitting said message via said communication link.

2. An arrangement as claimed in claim 1 comprising a plurality of message sources respectively generating messages with different playback requirements, and wherein said server is adapted, via a further communication link and a switch, to receive said messages from said plurality of message sources.

3. An arrangement as claimed in claim 1 wherein said service data source comprises said message source.

4. An arrangement as claimed in claim 3 comprising a plurality of service data sources, each comprising a message source, and a switch for selectively connecting one of said service data sources at a time to said server for supplying service data and a message from said one of said service data sources to said server.

5. An arrangement as claimed in claim 4 comprising a memory in which all of the service data sources in said plurality of service data sources are stored.

6. An arrangement as claimed in claim 4 comprising a memory in which said service data source is stored.

7. An arrangement as claimed in claim 1 wherein said message source generates said message as an arbitrarily formatted data file, and wherein said information stored in said data bank includes identification of respective data file formats processible by the respective terminal devices, and wherein said server comprises a conversion unit for, dependent on said information from said data bank, converting said data file format of said message into the data file format processible by said selected one of said terminal devices.

8. An arrangement as claimed in claim 1 wherein said data bank, said at least one service data source and said server are disposed together in a service center.

9. A service data and message communication system comprising:

a plurality of terminal devices having respectively different playback capabilities;

a data bank in which information identifying the respective playback capabilities of said terminal devices is stored;

at least one service data source;

at least one message source which generates at least one message having a playback requirement; and a server adapted to produce a communication link to a selected one of said terminal devices, said server having access to said service data from said service data source and having access to said information stored in said data bank, and being connectable to said message source to receive said at least one message therefrom, said server determining from said information in said data bank whether said selected one of said terminal devices has playback capability matched to the playback requirement of said message and, if so, said server transmitting said message together with said service data via said communication link.

10. A system as claimed in claim 9 comprising a plurality of message sources respectively generating messages with different playback requirements, and wherein said server is adapted, via a further communication link and a switch, to receive said messages from said plurality of message sources.

11. A system as claimed in claim 9 wherein said service data source comprises said message source.

12. A system as claimed in claim 9 comprising a plurality of service data sources, each comprising a message source, and a switch for selectively connecting one of said service data sources at a time to said server for supplying service data and a message from said one of said service data sources to said server.

13. A system as claimed in claim 12 comprising a memory in which all of the service data sources in said plurality of service data sources are stored.

14. A system as claimed in claim 9 comprising a memory in which said service data source is stored.

15. A system as claimed in claim 9 wherein said message source generates said message as an arbitrarily formatted data file, and wherein said information stored in said data bank includes identification of respective data file formats processible by the respective terminal devices, and wherein said server comprises a conversion unit for, dependent on said information from said data bank, converting said data file format of said message into the data file format processible by said selected one of said terminal devices.

16. A system as claimed in claim 9 wherein said data bank, said at least one service data source and said server are disposed together in a service center.

17. A system as claimed in claim 9 wherein one of said terminal devices is a postage meter machine, and wherein said data bank stores playback capability information for said postage meter machine indicating said postage meter machine can process image data files and text data files.

18. A system as claimed in claim 9 wherein one of said terminal devices is a postal scale, and wherein said data bank stores playback capability information for said postal scale indicating said postal scale can process running text data files.

19. A system as claimed in claim 9 wherein one of said terminal devices is a personal computer, and wherein said data bank stores playback capability information for said personal computer indicating said personal computer can process at least one of sound data files and vide data files.

20. A method for offering a message when loading service data to a terminal device, comprising the steps of:

storing information identifying respective playback capabilities for a plurality of terminal devices;

storing service data occasionally needed by at least one of said terminal devices;

generating at least one message at a message source, said message having a playback requirement associated therewith;

when a need for said service data by said at least one of said terminal devices occurs, establishing a communication link between a server and said one of said terminal devices and providing said server with access to said service data and said information stored in said data bank and said message;

in said server, determining whether said playback requirement of said message is matched to said playback capability of said one of said terminal devices, using said information stored in said data bank and, if so, transmitting said service data and said message to said one of said terminal devices via said communication link.

21. A method as claimed in claim 20 wherein the step of storing information in said data bank includes storing information in said data bank respectively identifying data file formats which are processible by the respective terminal devices, and wherein the step of generating a message comprises generating a message with an arbitrary data file format, and comprising the step of converting the data file format of said message to match the data file format processible by said selected one of said terminal devices.

22. A method as claimed in claim 20 comprising selecting said one of said terminal devices dependent on the playback capability necessary for matching the playback requirement of said message.

23. A method as claimed in claim 20 comprising playing back said message at said selected one of said terminal devices during communication via said communication link.

24. A method as claimed in claim 20 comprising playing back said message at said selected one of said terminal devices after communication via said communication link.

25. A method as claimed in claim 20 wherein said selected one of said terminal devices has a visual display, and comprising the step of playing back said message at said selected one of said terminal devices on said display.

* * * * *